United States Patent [19]

Yamagishi et al.

[11] Patent Number: 5,038,155

[45] Date of Patent: Aug. 6, 1991

[54] RECORDING APPARATUS

[75] Inventors: Syoitchi Yamagishi; Naoharu Narusawa; Yoshihiro Kitazawa, all of Nagano, Japan

[73] Assignee: Fuji Photo Film Co., Ltd., Kanagawa, Japan

[21] Appl. No.: 382,935

[22] Filed: Jul. 21, 1989

[30] Foreign Application Priority Data

| | | | |
|---|---|---|---|
| Jul. 22, 1988 | [JP] | Japan | 63-181817 |
| Aug. 8, 1988 | [JP] | Japan | 63-196065 |
| Aug. 8, 1988 | [JP] | Japan | 63-196066 |
| Aug. 16, 1988 | [JP] | Japan | 63-202744 |
| Aug. 17, 1988 | [JP] | Japan | 63-203293 |
| Oct. 24, 1988 | [JP] | Japan | 63-37739[U] |
| Oct. 24, 1988 | [JP] | Japan | 63-137738[U] |
| Oct. 24, 1988 | [JP] | Japan | 63-266132 |
| Oct. 24, 1988 | [JP] | Japan | 63-266133 |
| Oct. 24, 1988 | [JP] | Japan | 63-266134 |

[51] Int. Cl.[5] .............................................. G01D 15/10

[52] U.S. Cl. ................................ 346/76 PH; 346/136

[58] Field of Search ........................... 346/76 PH, 136

[56] References Cited

U.S. PATENT DOCUMENTS 4,811,036 3/1989 Gaskill et al. .................. 346/76 PH 4,844,666 1/1990 Ishikawa et al. ............... 346/76 PH

*Primary Examiner*—Benjamin R. Fuller

*Assistant Examiner*—Gerald E. Preston

*Attorney, Agent, or Firm*—Sughrue, Mion, Zinn, Macpeak & Seas

[57] ABSTRACT

A recording apparatus in which a heat-sensitive sheet wound in the form of a roll is drawn out for a printing operation is improved in performance in various manners, for instance, by controlling the loading and forwarding of the heat-sensitive sheet, or by controlling the printing means such as thermal printers, or by improving sheet conveying means such as conveying rollers.

Specific features include a two sheet entry path into the recording apparatus, one for accommodating a single sheet and one for accommodating a roll of sheet material. Further, the printing units are arranged in a staggered manner in a transverse direction relative to the delivery direction of the recording material, and each of the printing units has a predetermined main scanning length. In addition, any wandering or meandering of the sheet material can be detected accurately by detecting an angle of a roller arm in contact with the upper surface of the sheet material.

21 Claims, 12 Drawing Sheets

RECORDING APPARATUS

BACKGROUND AND SUMMARY OF THE INVENTION

This invention relates to recording apparatuses, and more particularly to a recording apparatus which is effectively used for a CAD (computer-aided automatic drafting device) which records data on a recording sheet of large size such as size A0.

Typical examples of an apparatus for recording data on a recording sheet of size A0 are a printing apparatus of photographic system and a recording apparatus of electrostatic recording system. They are extensively employed in a large number of fields. On the other hand, a CAD for facilitating the formation of design drawings has been put in practical use, and a variety of recording apparatuses for such a CAD have been also proposed in the art.

In recording data on a recording sheet of large size such as size A0, it is not preferable to use all the parts of the recording sheet simultaneously, because the recording apparatus which can record data in this manner is unavoidably intricate in construction. In order to overcome this difficulty, a recording means having a predetermined main scanning length is used to scan the recording sheet relatively in the auxiliary scanning direction.

In a recording apparatus of electrostatic recording system, for instance a charging member whose main scanning length is substantially equal to the width of a recording sheet is used to charge the recording sheet to form a latent image thereon, and the latter is developed by applying toner or ink droplets thereto, to form the image.

When the recording means scans the recording sheet in a relative mode, the following two methods are employed: In the first method, the recording means scans the recording sheet which is at rest. In the second method, the recording means is at rest, while the recording sheet is conveyed.

In this connection, in the case where it is required to accurately convey a large size recording sheet of large size such as that of size A0 with a plurality of coaxial rollers the cylindrical outer walls of those rollers must be polished with high precision.

OBJECTS AND SUMMARY OF THE INVENTION

Accordingly, an object of this invention is to eliminate the above-described difficulty accompanying a conventional recording sheet conveying method, and more specifically a method of assembling a roller device with which a recording sheet can be conveyed with high accuracy.

The object of the invention has been achieved by the provision of a method of assembling a roller device comprising: a plurality of rollers for conveying a recording material; coupling means for coupling the shafts of the rollers; bearings supporting the shafts; and a base for fixing the bearing, in which, according to a first aspect of the invention, after the cylindrical walls of the rollers are polished, the shafts of the rollers are coupled, and after the rollers supported by the bearing are fixed in the base, the cylindrical walls of the rollers are polished again.

In the method of the invention, the rollers polished are joined coaxially and positioned in the base, and their cylindrical walls are polished again. As a result, all the rollers are equal in diameter and surface roughness. Accordingly, the rollers are brought uniformly in contact with the recording sheet, whereby the latter is conveyed with high accuracy.

In the method of the invention, the recording material is not limited to a particular one; that is, it may be for instance a heat-sensitive recording material. And the heat-sensitive sheet may be of paper, plastic film, etc. which is suitable for printing data on it by heating.

A recording apparatus in which an elongated recording material wound in the form of a roll is pulled out a predetermined length for a recording operation suffers from the following difficulty: If the recording material is incorrectly positioned on the recording material conveying path, it may come greatly aside from the recording material conveying path before being discharged from the recording apparatus, at result of which the resultant record is unsatisfactory.

For instance in the case where the recording material is a heat-sensitive sheet, a thermal head having sheet in the auxiliary scanning direction, to achieve the printing operation. In the recording apparatus in which its thermal head is divided into thermal head pieces which are extended in the main scanning direction and arranged in a plurality of lines, and all the thermal head pieces are used to achieve a printing operation of one line with the heat-sensitive sheet conveyed, the auxiliary scanning direction of the thermal head must be coincided with the direction of movement of the thermal head or the heat-sensitive sheet.

However, if the recording apparatus is so designed that, when the heat-sensitive sheet is loaded in it or it is jammed in it, the printing section is opened, sometimes the main scanning direction of the thermal head is not coincided with the direction of conveyance of the heat-sensitive sheet when the printing section is closed. In this case, all the thermal head pieces cannot scan one and the same line, and accordingly the resultant record is unsatisfactory in the quality of print.

Accordingly, another object of the invention is to provide a recording apparatus in which the above-described difficulty has been eliminated; i.e., when the printing section which can be freely opened and closed is closed, the main scanning direction of the printing means is positively coincided with the direction of conveyance of the recording material, whereby the printing operation is carried out with high accuracy.

As was described above, for instance in the case where the recording material is a heat-sensitive sheet, a thermal head having a predetermined main scan length scans the heat-sensitive sheet in the auxiliary scanning direction, to achieve the printing operation. In the recording apparatus in which its thermal head is divided into thermal head pieces which are extended in the main scanning direction and arranged in a plurality of lines and all the thermal head pieces are used to achieve a printing operation of one line with the heat-sensitive sheet conveyed, the auxiliary scanning direction of the thermal head must be coincided with the direction of movement of the thermal head or the heat-sensitive sheet.

However, if the recording sheet conveying path is long, then the slight meandering of the recording material in the upstream region of the recording material conveying path is amplified in the downstream region thereof, as a result of which the auxiliary scanning direction of the thermal head is not coincided with the direction of conveyance of the recording material, and accordingly the recording operation is not correctly carried out by the printing section.

Accordingly, another object of the invention is to eliminate the above-described difficulty accompanying a conventional recording apparatus, more specifically, to provide means for detecting the meandering of a sheet-shaped material thereby to convey the latter correctly.

Another object of the invention is to provide a method of correcting the meandering of a sheet-shaped material to perform a printing operation with high accuracy.

As the sheet-shaped material meanders, the amount of slackening thereof is change, and accordingly the arm of a roller held in contact with the upper surface of the sheet-shaped material is changed in angle. Therefore, the meandering of the sheet-shaped material can be accurately detected by detecting the angle of the arm.

For instance in the case where the recording material is a heat-sensitive sheet, a thermal head having a predetermined main scanning length scans the heat-sensitive sheet in the auxiliary scanning direction for printing data on it. In this connection, a recording apparatus has been proposed in the art in which the thermal head is divided into thermal head pieces, which are arranged in the main scanning direction and in a plurality of lines, and all the thermal head pieces are operated to print one line while the heat-sensitive sheet is being conveyed.

In the case where the printing section performs a printing operation with the heat-sensitive sheet being conveyed, rollers for conveying the heat-sensitive sheet are provided in the printing section. In this connection, in a recording apparatus for printing a heat-sensitive sheet of large size such as that of size A0, the printing means and the conveying means should be arranged suitably and effectively, in order to miniaturize the recording apparatus.

The heat-sensitive sheet wound in the form of a roll is pulled out for a data recording operation. If, in this case, the heat-sensitive sheet is conveyed with its front end portion curled, then the front end portion may be not conveyed in the correct direction, as a result of which the heat-sensitive sheet may jammed or caught in the sheet conveying path.

Accordingly, another object of the invention is to eliminate the above-described difficulty; more specifically, to provide a jamming preventing device which, even if the recording material has been wound in the form of a roll prevents the jamming of the recording material in the recording material conveying path which is resulted from its curling.

In the jamming preventing device of the invention, an endless belt rotating together with a conveying roller adapted to convey the recording material is driven in the direction of conveyance of the recording material, as a result of which the front end portion of the recording material is guided correctly, whereby, in the recording material conveying path, the jamming of the recording material is prevented. Furthermore, since the belt is run at the same speed as the conveying roller, the recording material will not be brought into slide contact with the belt, and accordingly no scratches are formed in the surface of the recording materials.

The jamming preventing device of the invention is suitable for a recording apparatus in which a recording material wound in the form of a roll is pulled out and conveyed for a data recording operation; however, it is equally applicable to a recording apparatus in which a recording material cut in the form of a piece of paper is conveyed, in order to positively guide the recording material in the direction of conveyance.

If, in the recording apparatus, the thermal heads are not in position, then the prints done by the adjacent thermal heads are not continuous; that is, the resultant record is unsatisfactory.

Accordingly, another object of the invention is to provide a thermal head position adjusting device for a recording apparatus, which can accurately adjust the positions of the thermal heads installed therein.

In the thermal head position adjusting device of the invention, adjusting screws threadably engaged with a base board supporting the thermal head have conical end portions which are brought into contact with the edges of the thermal head. The adjusting screws are turned to change the amounts of protrusion of the conical end portions thereby to slide the thermal head little at a time, whereby the position of the thermal head can be finely adjusted.

In order to bring the thermal head in contact with the heat-sensitive sheet in its entirely, the thermal should be so designed that its longitudinal direction is changeable.

On the other hand, if, in the case where the thermal head is rotatably provided, a member for turning the thermal head is installed with play, then the thermal head may be shifted in position, with the result that an accurate recording operation is not carried out.

Accordingly, another object of the invention is to eliminate the above-described difficulty; more particularly, to provided a thermal head mounting device with which the thermal head can be rotatably installed with high reliability, and the position of the thermal head thus installed can be finely adjusted.

In the thermal head mounting device of the invention, rolling elements provided at the ends of a base board, to which the thermal head is secured, are in contact with a support member, thus maintaining the distance between the base board and the support member constant. Therefore, even if the base board is mounted on a rotary shaft with play, the main scanning direction of the thermal head is maintained correct. Since one of the guide members adapted to guide the rolling elements is adjustable in the amount of protrusion from the support member, the thermal head is positioned in the correct direction when installed.

In order to convey a recording material, the recording apparatus has a mechanism with which pinch rollers are rotated while holding the recording material therebetween. In the mechanism, it is necessary to push the pinch rollers against each other under a certain pressure. For this purpose, elastic means is provided to push one of the pinch rollers against the other while the pinch rollers are rotatably supported. And it is necessary to provide locking means respectively for the pinch rollers so that, even when the pinch rollers are kept urged by the elastic means, they are positioned in place when disengaged.

However, the above-described mechanism is disadvantageous in that because the elastic means and the locking means must be provided for each pair of pinch rollers, the resultant recording apparatus is intricate in construction, and the pinch roller section is rather bulky.

Accordingly, another object of the invention is to provide a pinch roller device which allows the pinch rollers to push each other and to release each other without increasing the size of the pinch roller section, and allows the pinch rollers to positively push each other after disengaged.

In the pinch roller device according to the invention, the pinch rollers on the movable side are supported by support arms, and the support arms are rotatably mounted on one shaft, whereby two pair of pinch rollers can be movably supported. And the support arms Therefore, the pinch rollers are positioned in place when released, so that, after the pinching rollers are released, they can be positively pushed against each other again with ease.

In order to load a recording sheet of large size such as size A0 in large quantities in the recording apparatus, it is preferable to wind it in the form of a roll. The recording sheet thus wound is, in general, pulled out for a printing operation.

However, when the recording sheet is wound in this, then the resultant roll is so heavy that it is rather difficult to load it in the recording apparatus. On the other hand, in order to accurately pull out the recording sheet, it is necessary to accurately position the recording sheet with respect to the support means which rotatably supports the recording sheet.

Accordingly, another object of the invention is to solve the above-described problems as to the handling of the recording sheet; more specifically to provide a device for supporting a recording sheet wound in the form of a roll with which the recording sheet can be loaded in the recording apparatus with ease.

The nature, principle and utility of the invention will become more apparent from the following detailed description of the invention and the appended claims when read in conjunction with the accompanying drawings.

Figure 18A:
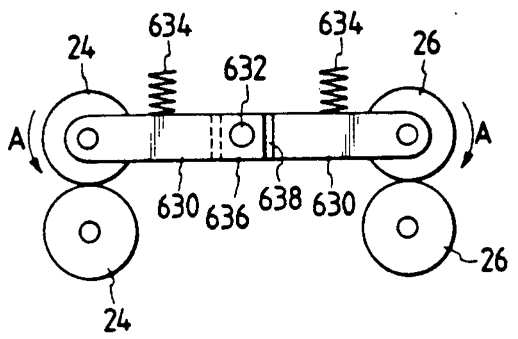
Figure 18B:
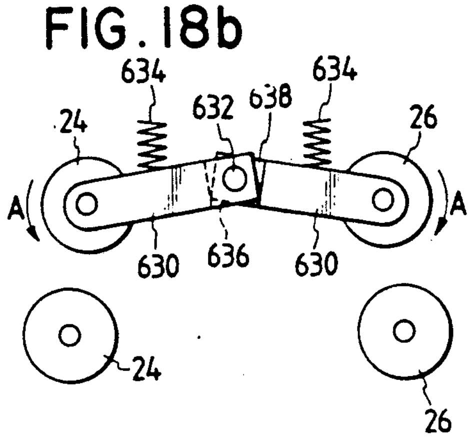
Figure 19A:
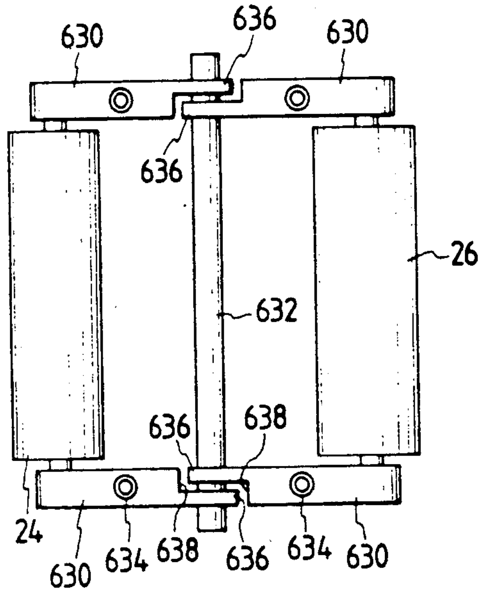
Figure 19B:
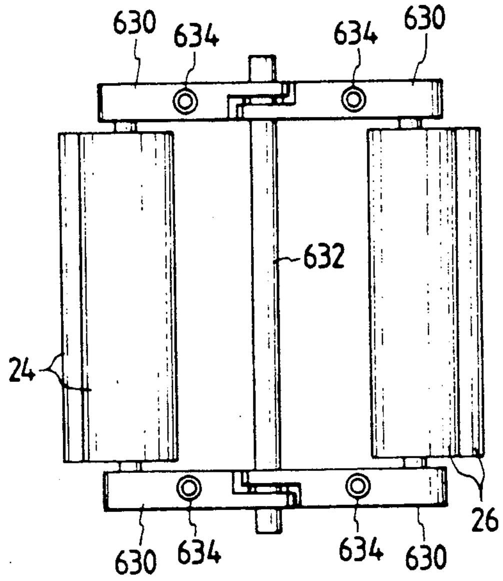
Figure 20:
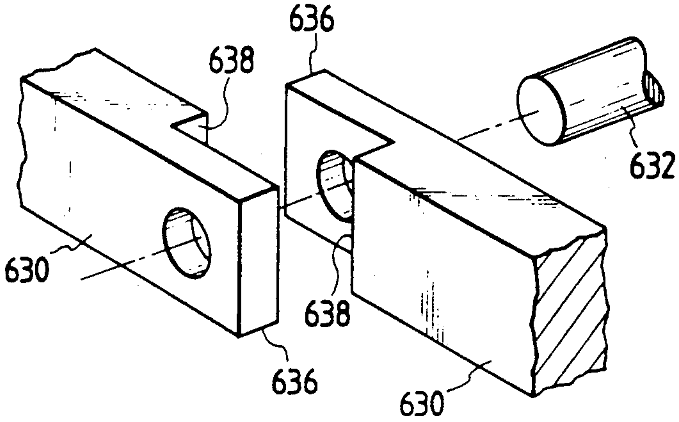
Figure 21:
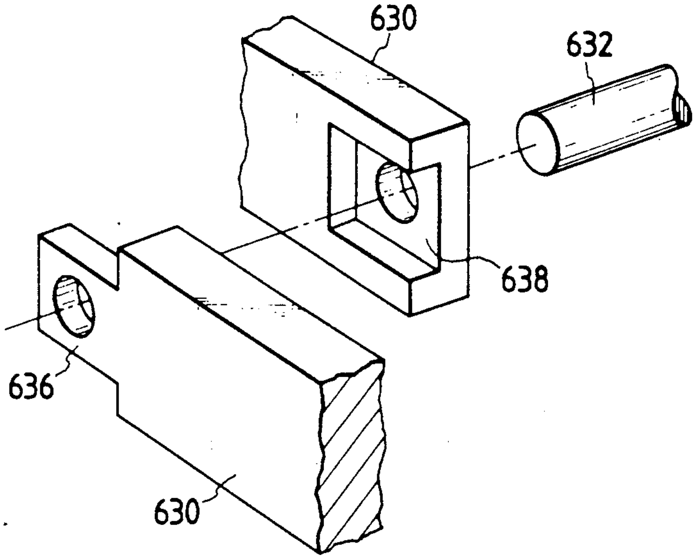
Figure 22:
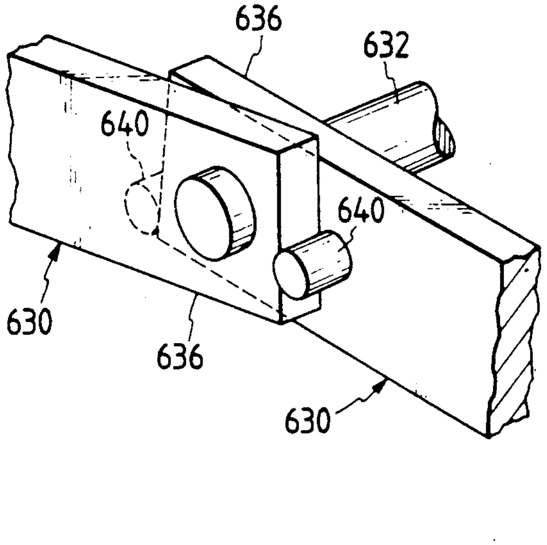
Figure 23:
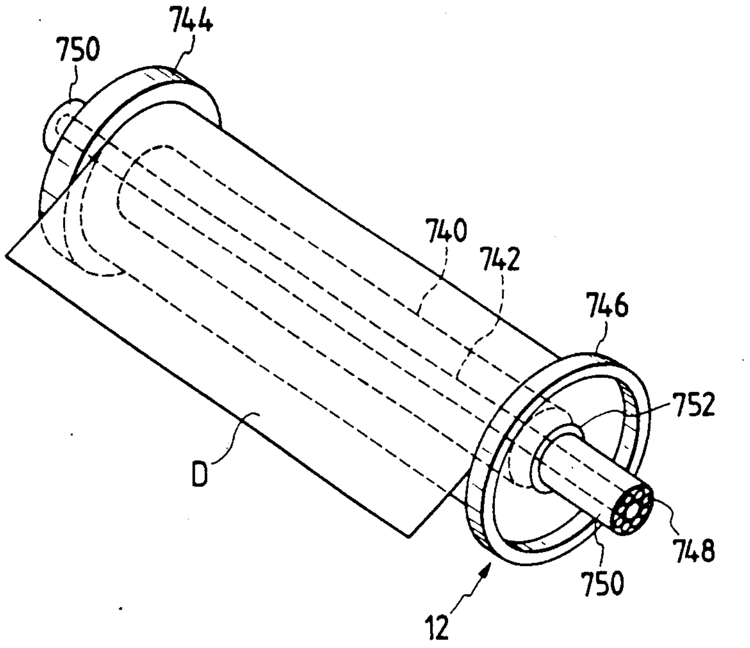
Figure 24:
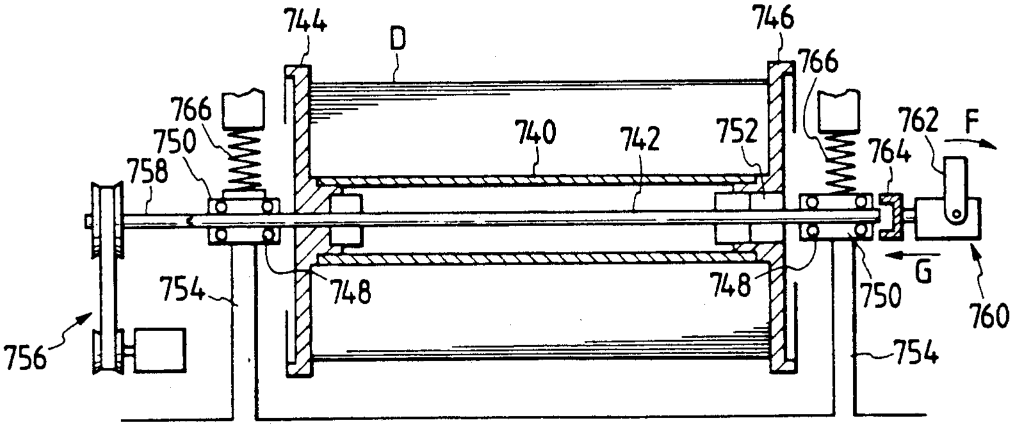

The part (a) of FIG. 18 is a side vide showing rollers abutted against each other in one example of a pinch roller device in a recording apparatus according to the invention, and the part (b) of FIG. 18 is a side view showing the rollers spaceu away from each other;

The part (a) of a plan view showing the rollers abutted against each other, and the part (b) of FIG. 19 is a plan view showing the rollers spaced away from each other;

FIG. 20 is an exploded view showing the vicinity of the swingably supported end portions of support arms in the pinch roller device;

FIGS. 21 and 22 are perspective views showing modifications of the swignably supported end portions of the support arms; and FIGS. 23 and 24 show a paper roll supporting mechanism according to the invention.

DETAILED DESCRIPTION OF THE INVENTION

Preferred embodiments of this invention will be described with reference to the accompanying drawings.

Figure 1:
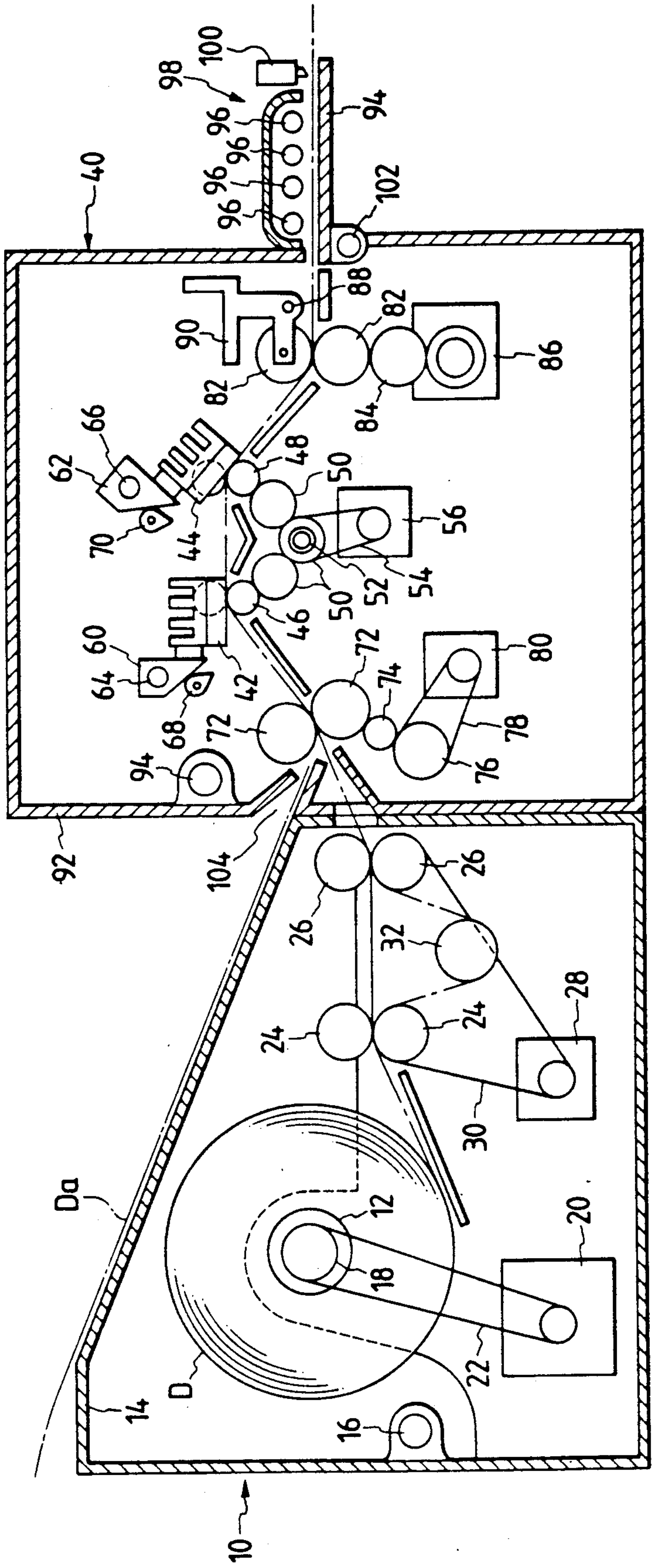
FIG. 1 is an explanatory diagram outlining the arrangement example of a recording apparatus according to this invention.

FIG. 1 outlines the arrangement of a recording apparatus using recording sheet.

The recording apparatus is to print a heat-sensitive sheet of size A0 according to image signals processed by an image processing device (not shown) such as a computer. The recording apparatus comprises: a heat-sensitive sheet accommodating section 10 in which a heat-sensitive sheet D in the form of a roll is loaded; and a printing section 40 for printing the heat-sensitive sheet D supplied from the accommodating section 10.

The heat-sensitive sheet D loaded in the accommodating section 10 is 914 mm or 1189 mm in width, and is wound on a bobbin 12 to a length of 200 m. The accommodating section 10 comprises an upper housing 14 which is rotatably supported on a shaft 16, so that it is turned to open the accommodating section 10 when the heat-sensitive sheet D is loaded therein or unloaded therefrom.

The accommodating section 10 further comprises: an electric motor 20 for driving a shaft 18 on which the bobbin 12 is fixedly mounted. The bobbin 12 is rotated by the motor through an endless belt 22 laid over the motor 20 and the shaft 18. The accommodating section 10 further comprises: conveying rollers for pulling and conveying the heat-sensitive sheet D forwardly (i.e. in the direction of movement of the heat-sensitive sheet D) from the bobbin 12; and an electric motor 28 for rotating the conveying rollers 24 and 26. These rollers 24 and 26 are rotated by the motor 28 through an endless belt 30 laid over the end portions of the conveying rollers 24 and 26 and the output shaft of the motor 28. A tension roller 32 is provided between the conveying rollers 24 and 26 in such a manner that it is in contact with the upper surface of the heat-sensitive sheet D. The tension roller 32 is movable vertically to adjust the tension of heat-sensitive sheet D.

The upper conveying rollers 24 and 26 and the tension roller 32 are mounted on the upper housing 14, so that they are moved together with the upper housing 14 when the latter is turned.

The printing section 40 comprises two thermal heads 42 and 44 which are arranged in two lines and spaced a predetermined distance from each other on the path of conveyance of the heat-sensitive sheet D. The thermal heads 42 and 44 are electrically connected to the image processing device to print the heat-sensitive sheet according to image signals provided by the device.

Platen rollers 46 and 48 are provided below the thermal heads 42 and 44, respectively. The platen rollers 46 and 48 are rotated by an electric motor 56 through gears 50, a one-way clutch 52 and an endless belt 54. The thermal heads 42 and 44 have support members 60 and 62 which are rotatably mounted on shafts 64 and 66, respectively. And eccentric cams 68 and 70 are abutted against the support members 60 and 62, respectively.

The printing section 40 further comprises: conveying rollers 72 for conveying the heat-sensitive sheet D from the accommodating section 10 towards the thermal heads 42 and 44. The conveying rollers 72 are rotated by an electric motor 80 through a gear 74, a clutch 76 and an endless belt 78. Conveying rollers 82 are provided downstream of the thermal heads 42 and 44, so that the heat-sensitive sheet D is positively moved out of the printing section 40. The conveying rollers 82 are driven through a gear 84 by an electric motor 86. The upper one of the conveying rollers 82 is supported by a swing member 90 which is swingable about a shaft 88. That is, the upper conveying roller 82 is moved into or out of engagement with the lower conveying roller 82 by swinging the swinging member 90.

The printing section 40 has an upper housing 92. The upper housing 92 is rotatably supported by a shaft 94, so that the printing section 40 can be opened for instance when the heat-sensitive sheet is jammed in it.

The upper conveying roller 72 is mounted on the upper housing 92, and therefore it is moved together with the upper housing 92 when the latter 92 is opened.

The printing section 40 is provided with a sheet discharging stand 94 for discharging the heat-sensitive sheet printed. A fixing unit 98 comprising a plurality of lamps 96 is provided over the sheet-discharging stand 94 when necessary. The fixing unit 98 applies light to the printed surface of the heat-sensitive sheet D to fix the image thereon. A cutter 100 for cutting the heat-sensitive sheet D is provided at the front end portion of the sheet discharging stand 94. The sheet discharging stand 94, the fixing unit 98, and the cutter 100 form one unit, which is a sheet discharging section. The sheet discharging stand 94 is rotatably mounted on a shaft 102. Therefore, when the recording apparatus is not in operation, the one unit can be set on the front side of the printing section 40 by turning the sheet discharging stand 94 clockwise in FIG. 1.

The heat-sensitive sheet D in the form of a roll is loaded in the recording apparatus as follows: First, the upper housings 14 and 92 of the accommodating section 10 and the printing section 40 are turned to expose the heat-sensitive sheet conveying path. Then, the swinging member 90 of the printing section 40 is turned to disengage the conveying rollers 82 from each other. Under this condition, the front end portion of the heat-sensitive sheet D is positioned in the direction of width, and it is held between the conveying rollers 82. Thereafter, the upper housings 14 and 92 of the accommodating section 10 and the printing section 40 are closed, so that the upper conveying rollers 24, 26 and 72 which are mounted on the upper housings 14 and 92 are engaged through the heat-sensitive sheet D with the lower conveying rollers 24, 26 and 72, respectively. In this operation, in the accommodating section 10, the tension roller 32 is abutted against the upper side of the heat-sensitive sheet D to stretch the latter tight.

A sheet inserting opening 104 is formed in the wall of the printing section 40 which is close to accommodating section 10. The sheet inserting opening 104 is used to insert a heat-sensitive sheet Da different from the above-described heat-sensitive sheet D along the sloped upper wall of the upper housing of the accommodating section 10 into the printing section 40. The heat-sensitive sheet Da is inserted into the sheet inserting opening 104 as follows: Before insertion of the heat-sensitive sheet Da, the heat-sensitive sheet D extended in the printing section 40 is moved backwardly by turning the bobbin in the reverse direction until the front end of the heat-sensitive sheet D is positioned after the conveying rollers 72 near the sheet inserting opening. Under this condition, the heat-sensitive sheet Da is inserted into the sheet inserting opening 104, whereupon, in the printing section 40, the conveying rollers 72 and 82 are driven to convey the heat-sensitive sheet Da, and the thermal heads 42 and 44 are operated to perform the printing operation. When it is required to print the heat-sensitive sheet D in the accommodating section 10 again, the conveying rollers 24 and 26 are driven to convey the heat-sensitive sheet D into the printing section, and the thermal heads 42 and 44 are operated.

Figure 2:
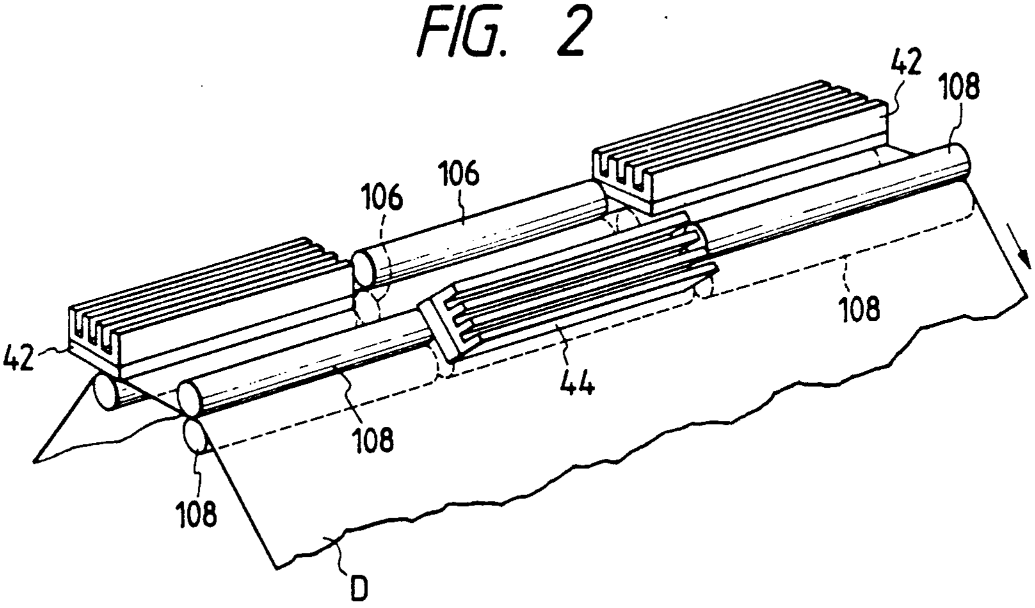
FIG. 2 is a perspective view showing a part of a printing section the recording apparatus of FIG. 1.

Now, the printing section will be described with reference to FIG. 2 in more detail.

The thermal heads 42 and 44 are arranged in two lines; that is, the thermal heads 42 and 44 in two lines prints one line. In the near line, two thermal heads 42 are arranged, and conveying rollers 106 are provided between the two thermal heads 42. In the front line, one thermal head 44 is arranged, and conveying rollers 108 are provided on both sides of the thermal head 44. The length of each of the thermal heads 42 and 44 is one-third ($\frac{1}{3}$) of the width of the heat-sensitive sheet D. The thermal heads perform a printing operation with a density of 16 or L 400 dots/mm. In printing, the heat-sensitive sheet D is divided into three equal regions in the direction of width, and the thermal head 44 covers the middle of the three equal regions while the thermal heads 42 cover the remaining two end regions. Accordingly, in printing one line, first the thermal heads 42 in the rear line print the end regions, and in a predetermined period of time; that is, when the part of the heat-sensitive sheet D which has been under the rear thermal heads 4 reaches the front thermal head 44, the latter 44 prints the middle region.

The heat-sensitive sheet D being printed with the thermal heads 42 and 44 is conveyed by the conveying rollers 82 located near the sheet discharging section. The conveying rollers 106 and 108 in alignment with the thermal heads 42 and 44 are coupled through the one-way clutch 52 to the motor 56. Therefore, when the heat-sensitive sheet is conveyed by the conveying rollers 82 located near the sheet discharging section, the conveying rollers 106 and 108 are idle. On the other hand, when the heat-sensitive sheet is automatically fed or it is moved backwardly, the conveying roller 106 and 108 are turned to move the heat-sensitive sheet D forwardly or backwardly.

As shown in FIG. 1, the eccentric cams 68 and 70 are abutted against the support members 60 and 62 of the thermal heads 42 and 44, respectively. When the heat-sensitive sheet is automatically supplied or it is conveyed backwardly; that is, when the thermal heads 42 and 44 are not in operation, the eccentric cams are turned through a predetermined angle, to move the thermal heads 42 and 44 away from the heat-sensitive sheet D.

Figure 3:
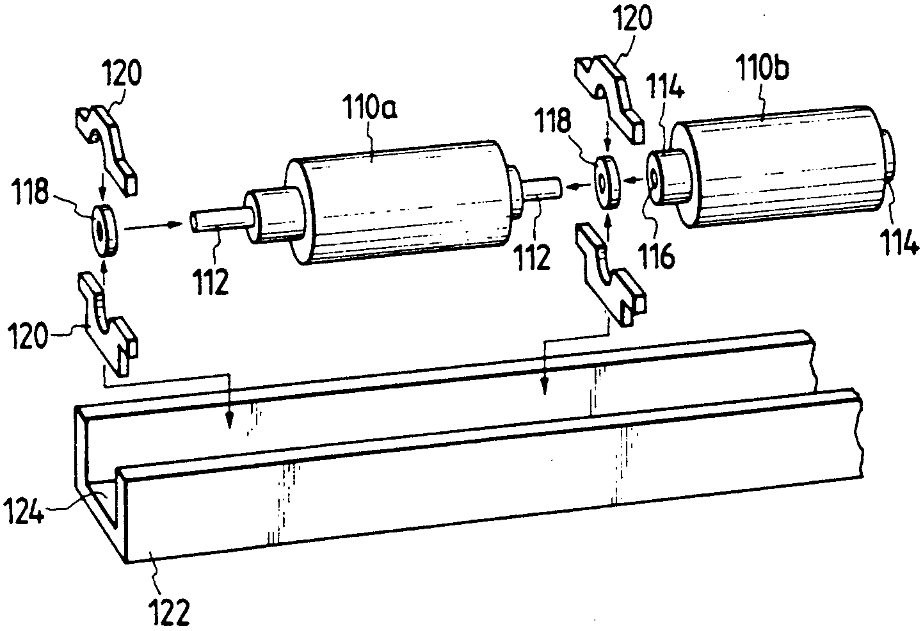
FIG. 3 is an exploded view of a conveying roller in the recording apparatus.

Now, a method of assembling the conveying rollers 82 provided near the sheet discharging section of the printing section 40 will be described with reference to FIG. 3.

Each conveying roller 82 is made up of a plurality of short rollers 110*a* and 110*b*. The small diameter shafts 112 of one short rollers 110*a* are press-fitted in the holes 116 of the large diameter shafts of other short rollers 110*b*. FIG. 3 shows only two short rollers 110*a* and 110*b* ; however, it is preferable to form the conveying roller 82 with five or six short rollers 110 or more short rollers. Before these short rollers 110*a* and 110*b* are assembled, their cylindrical walls are polished with high precision. The short rollers 110*a* and 110*b* thus polished are joined as described above, and then bearings 118 are mounted on the small diameter shafts 112. Each bearing is held between fixing members 120 which are separable vertically, and the fixing members 120 are fitted in the groove 124 formed in a base 122. After all the short rollers 110*a* and 110*b* have been joined and set in the base 122, the short rollers 110*a* and 110*b* together with the base 122 are polished on a polishing machine again, so that the resultant conveying roller is high in precision.

That is, even if the short rollers 110*a* and 110*b* are slightly different in diameter from one another, they are polished again at the same time, so that the resultant conveying roller 82 is uniform in diameter and in surface roughness. Accordingly, all the short rollers 110*a* and 110*b* are uniformly in contact with the heat-sensitive sheet D and the heat sensitive sheet can be conveyed with the force which is uniformly distributed in the direction of width of the sheet.

In order to convey the heat-sensitive sheet D from the accommodating section 10, a relatively high pressure is applied to the conveying rollers 82. However, the conveying rollers 82 can sufficiently withstand this high load because the bearings 118 are provided on both sides of each of the short rollers 110*a* and 110*b*.

The above-described technical concept may be applied to the conveying rollers 24, 26, 72 and 106 as well as the conveying rollers 82 located near the sheet discharging section.

As was described above, according to the invention, a plurality of rollers for conveying a recording material, after being polished, are joined coaxially and polished again. Therefore the assembly of the rollers is high in precision; i.e., uniform in diameter and in peripheral surface roughness. Accordingly, it, being brought uniformly into contact with recording material, conveys the latter with high accuracy.

Figure 4:
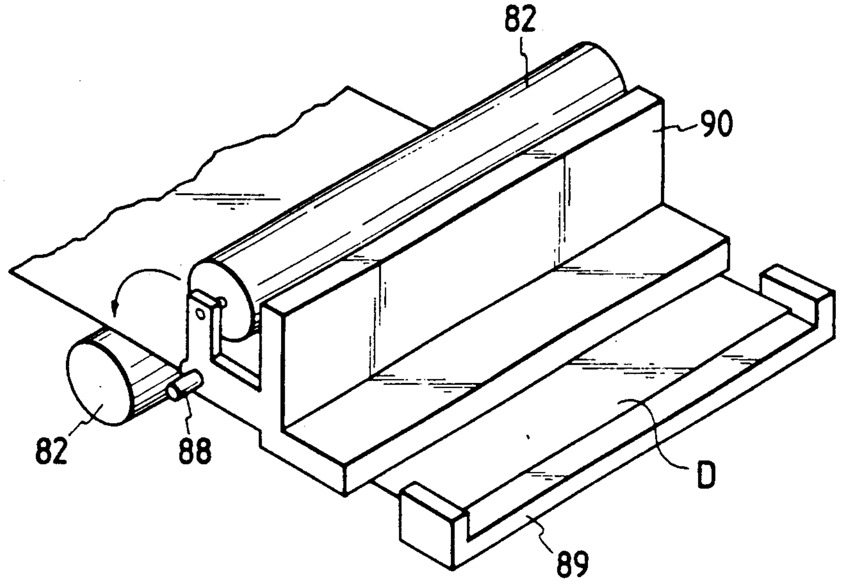
FIG. 4 is a perspective view showing the vicinity of a heat-sensitive sheet discharging section.

FIG. 4 shows the vicinity of the heat-sensitive sheet discharging section.

In the embodiment, in order to hold the front end portion of the heat-sensitive sheet D, it is necessary to hold the heat-sensitive sheet D with the rollers 82 provided near the sheet discharging section.

The roller 82 is rotatably mounted on the swing member 90. In loading the heat-sensitive sheet D, the swing member 90 is turned about the shaft 88, so that the rollers 82 are disengaged from each other as shown in FIG. 4. The front end portion of the heat-sensitive sheet D pulled out of the accommodating section 10 is inserted between the rollers 82 and positioned in place on the sheet conveying path. As shown in FIG. 4, a guide member 89 is provided to position both edges of the front end portion of the heat-sensitive sheet D in place on the sheet conveying path. Instead of the guide member 89, indexes for indicating the correct position of the heat-sensitive sheet D may be provided near the roller 82. After the heat-sensitive sheet D has been positioned correctly, the swing member 90 is turned in the direction of the arrow, the roller 82 is abutted through the heat-sensitive sheet D against the other roller 82 so that the sheet D is held therebetween uniformly in the direction of width.

Under this condition, the upper housings 14 and 92 of the accommodating section 10 and the printing section 40 are closed, so that the heat-sensitive sheet D is held between all the pairs of rollers, and is bent by the tension roller (or dancer roller) 32 so that it is stretched tight.

In the above-described embodiment, the rollers 82 are used to hold the heat-sensitive sheet D; however, other holding means may be additionally provided to hold the heat-sensitive sheet D. For instance, holding means such as clips for fixing only both ends of the front end portion of the heat-sensitive sheet D may be employed. However, the holding means should be so designed that, after the heat-sensitive sheet D has been held between all the pairs of rollers with the upper housings 14 and 92 closed in the accommodating section 10 and the printing section 40, the holding means will not obstruct the conveyance of the heat-sensitive sheet D.

In the recording apparatus according to the invention, the recording material holding means is provided near the recording material discharging section to position the recording material in position in the vicinity of the recording material discharging section, whereby the recording material can be conveyed from the recording material accommodating section to the recording material discharging section with high accuracy.

Figure 5:
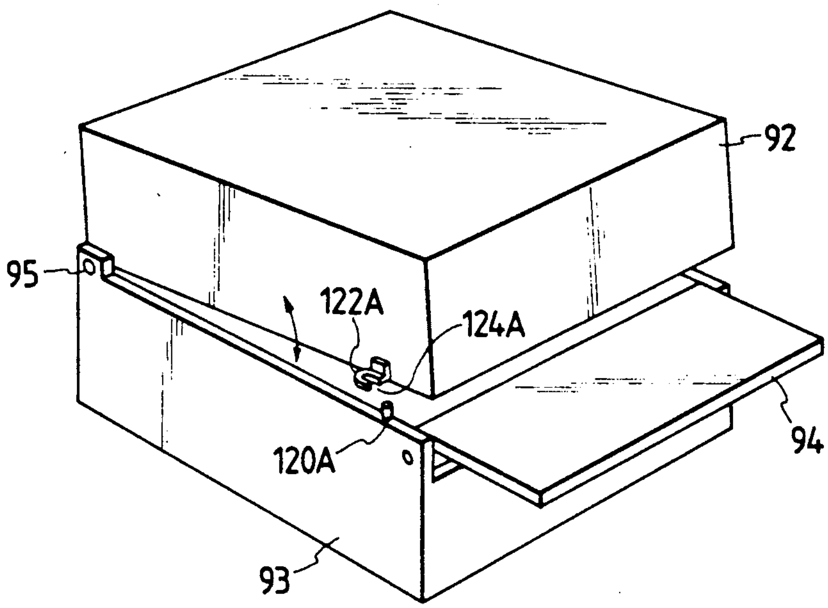
FIG. 5 is a perspective view of a printing section.

FIG. 5 is a perspective view showing the printing section 40 with the upper housing 92 turned. The upper housing 92 is swingable about its rear shaft 95, and has a locking member 122A at the front end portion. The locking member 122A has a cut 124A into which the pin 120A embedded in the printing section body 93 is inserted. The cut 124A is so formed in the locking member 122A that, only when the upper housing 92 is closed accurately with respect to the printing section body 93, the pin 120A is so guided as to be inserted in the cut 124A. Accordingly, when the pin 120A is inserted into the cut 124A of the locking member 122A, the upper housing 92 is regulated in its position in the direction of width of the heat-sensitive sheet D, and therefore the upper housing 92 can be closed accurately with respect to the printing section body 93 even when the front end portion of the upper housing plays in the direction of width of the heat-sensitive sheet D.

It is essential that the direction of width of the heat-sensitive sheet D is coincided with the main scanning direction of the thermal heads 42 and 44 in the upper housing 92, and the direction of conveyance of the heat-sensitive sheet D is coincided with the auxiliary scanning direction of the thermal heads 42 and 44.

If, when a straight line is printed in the direction of width of the heat-sensitive sheet D with the thermal heads 42 and 44 arranged in two lines, the auxiliary scanning direction of the thermal heads 42 and 44 is not coincided with the direction of conveyance of the heat-sensitive sheet D, then the straight line cannot be printed accurately.

Figure 6:
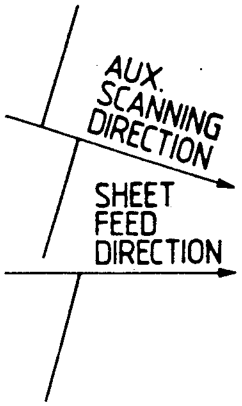
FIG. 6 and 7 are explanatory diagrams for a description of the printing of a straight line.
Figure 7:
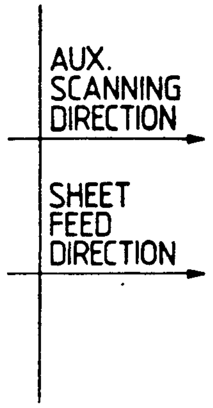

When the auxiliary scanning direction of the thermal heads 42 and 44 is not coincided with the direction of conveyance of the heat-sensitive sheet D, the straight line is printed as shown in FIG. 6; and when the auxiliary scanning direction is coincided with the direction of conveyance, the straight line is printed as shown in FIG. 7.

The rear thermal heads 42 is different from the front thermal head 44 in the position of print with respect to the direction of conveyance of the heat-sensitive sheet D. Therefore, if the auxiliary scanning direction of the thermal heads 42 and 44 is not coincided with the direction of conveyance of the heat-sensitive sheet, then the straight line is printed broken as shown in FIG. 6.

On the other hand, according to the invention, the upper housing 92 is closed accurately with respect to the printing section body 93 with the aid of the locking member 122A and the pin 120A, so that the auxiliary scanning direction of the thermal heads 42 and 44 is coincided with the direction of conveyance of the heat-sensitive sheet D. Accordingly, the straight lines printed by the thermal heads are continuous; that is, one straight line is printed by them over the width of the heat-sensitive sheet.

As was described above, in the recording apparatus according to the invention, when the swingable upper housing of the printing section is closed, it is fixed in position with the aid of the locking means, so that the auxiliary scanning direction of the printing means arranged in a plurality of lines is positively coincided with the direction of conveyance of the heat-sensitive sheet. Therefore, all the printing means can prints one and the same line accurately. Particularly in a large recording apparatus, the printing section's housing can be accurately positioned with ease, which contributes to an improvement of the working efficiency and to that of the reliability.

Figure 8:
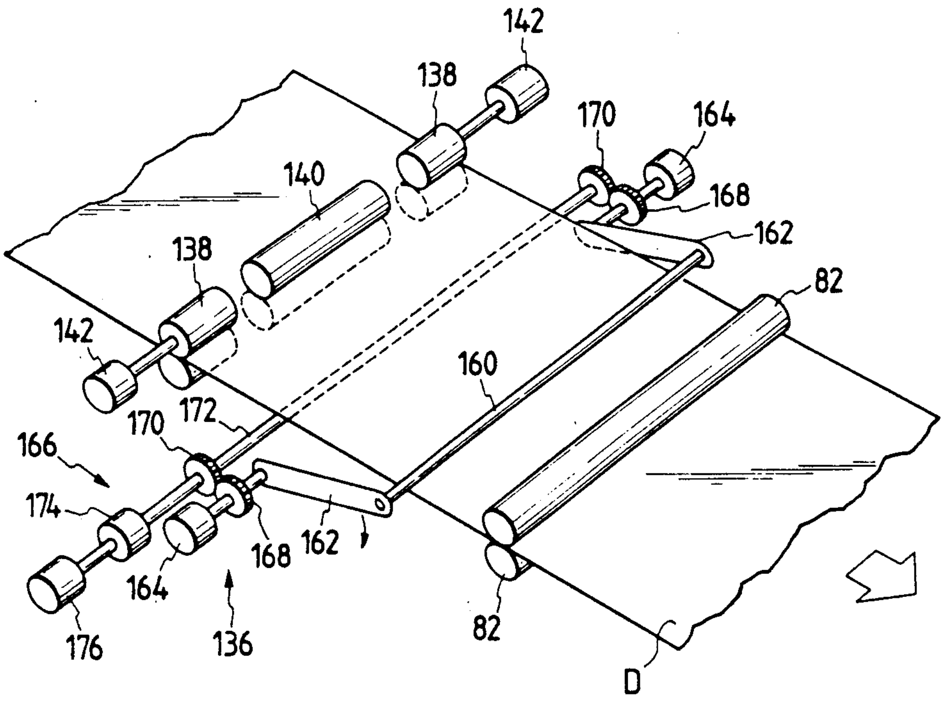
FIG. 8 is a perspective view outlining the arrangement of sheet conveying mechanism in the printing section.

FIG. 8 outlines the arrangement of a heat-sensitive sheet conveying mechanism in the printing section 40.

The heat-sensitive sheet D is printed by the thermal heads 42 and 44 while being pulled out of the accommodating section 10 and conveyed by the rollers 82. Upstream of the rollers 82, there are provided brake rollers 138 which applies tension to the heat-sensitive sheet D in the direction opposite to the direction of conveyance of the heat-sensitive sheet D conveyed by the rollers 82 in such a manner that they hold both edge portions of the heat-sensitive sheet D. The brake rollers 138 may be provided at any positions upstream of the roller 82. When necessary, free rollers 140 following the conveyance of the heat-sensitive sheet D are provided between the pairs of brake rollers 138. A brake 142 is provided for each of the pairs of brake rollers 138, to rotate the latter.

A meandering detecting device 136 is provided between the rollers 82 and the brake rollers 138, to detect the meandering of the heat-sensitive sheet D. The meandering detecting device 136 comprises: an elongated small-diameter roller 60 which is brought into contact with the upper surface of the heat-sensitive sheet D; a pair of arms 162 supporting the small-diameter roller 160; encoders 164 mounted on the rotary shafts which are turned together with the arms 162, to detect the angle of rotation of the arms 162; and an urging device 166 for urging the arms 162 clockwise in FIG. 8 so that the small-diameter roller 160 is in contact with the heat-sensitive sheet under a predetermined pressure. The urging device 166 comprises: driven gears 168 fixedly mounted on the rotary shafts of the pair of arms 162, respectively; driving gears 170 engaged with the driven gears 168, respectively; a shaft 172 on which the driving gears 170 are fixedly mounted; and an electric motor 176 coupled through an overload clutch 174 to the shaft 172.

The encoders 164 of the meandering detecting device 126 are electrically connected to the brakes 142, which are adapted to brake the brake rollers 138, through a control device which controls the braking forces of the brakes 142 according to the amount of meandering detected by the meandering detecting device 126.

In the meandering detecting device 136, the electric motor 176 transmits a predetermined driving force to the driving gears 170 and then through the driven gears 168 and the arms 162 to the small-diameter roller 160, so that the latter 160 pushes the heat-sensitive sheet D. When the heat-sensitive sheet D meanders, it is slackened on the side of one edge of the heat-sensitive sheet D, as a result of which the small-diameter roller 160 following the heat-sensitive sheet D is tilted and accordingly the arm 162 is swung. The angle of swing of the arm 162 is detected by the respective encoder 164; that is, the meandering of the heat-sensitive sheet is detected.

Upon detection of the meandering of the heat-sensitive sheet by the meandering detecting device 136, the control device controls the operation of the brake 142 thereby to adjust the tension which the brake roller 138 applies to the heat-sensitive sheet D, whereby the heat-sensitive sheet D is correctly conveyed along the sheet conveying path. That is, when both edge portions of the heat-sensitive sheet D become different in tension, the heat-sensitive sheet D, while being conveyed, is shifted in a widthwise direction so that the tension smaller is increased until it is equal to the other.

In the above-described embodiment, the meandering detecting device 136 is so designed that the elongated small-diameter roller 160 pushes the heat-sensitive sheet D over the entire width; however, it may be so modified that both edge portions of the heat-sensitive sheet D are pushed with two rollers, respectively.

Figure 9:
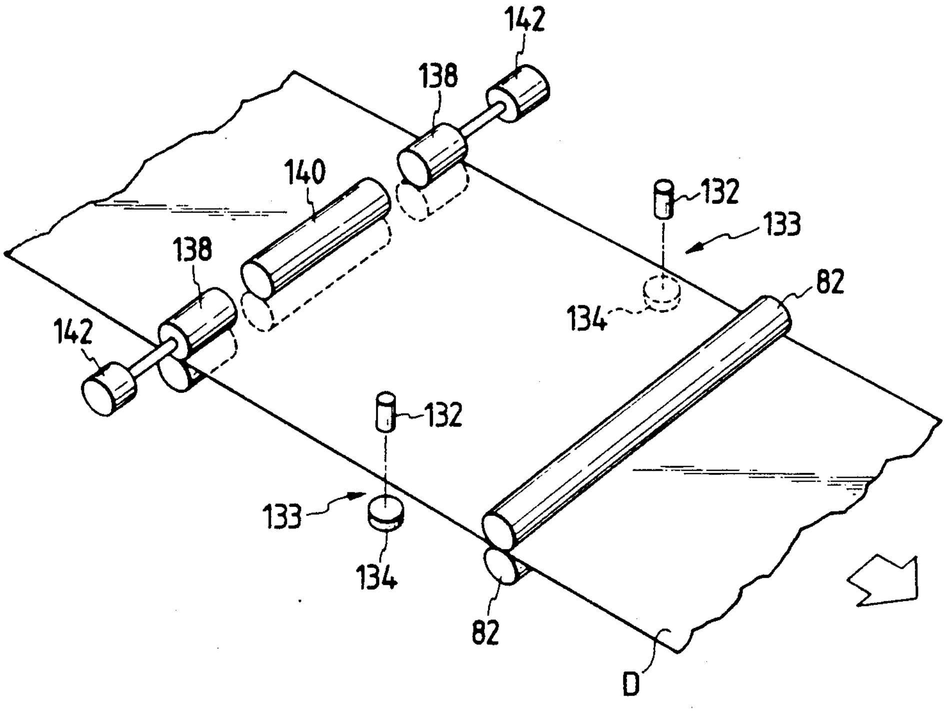
FIG. 9 is a perspective view showing one example of a device in the heat-sensitive sheet conveying mechanism.

FIG. 9 is a diagram outlining the arrangement of a heat-sensitive sheet conveying mechanism having another example of the meandering detecting device.

As shown in FIG. 9, two meandering detecting devices 133 each comprising alight emitting element 132 and a light receiving element 1 are disposed slightly outside the lines along which both edges of the heat-sensitive sheet D are moved, to regulate the sheet conveying path correctly.

The meandering detecting devices 133 are electrically coupled to the brakes 142 through a control device which controls the braking forces of the brakes 142 according to the amount of meandering detected by the meandering detecting means 133.

When the heat-sensitive sheet D comes outside of the predetermined sheet conveying path while being conveyed; that is, it is interposed between the light emitting element 132 and the light receiving element 134 on one side, the quantity of light received by the latter 34 is changed. In response to this change, the control device controls the braking force of the brake 142 thereby to adjust the tension which the brake roller 138 applies to the heat-sensitive sheet D, so that the heat sensitive sheet D is conveyed correctly along the predetermined sheet conveying path.

Figure 10:
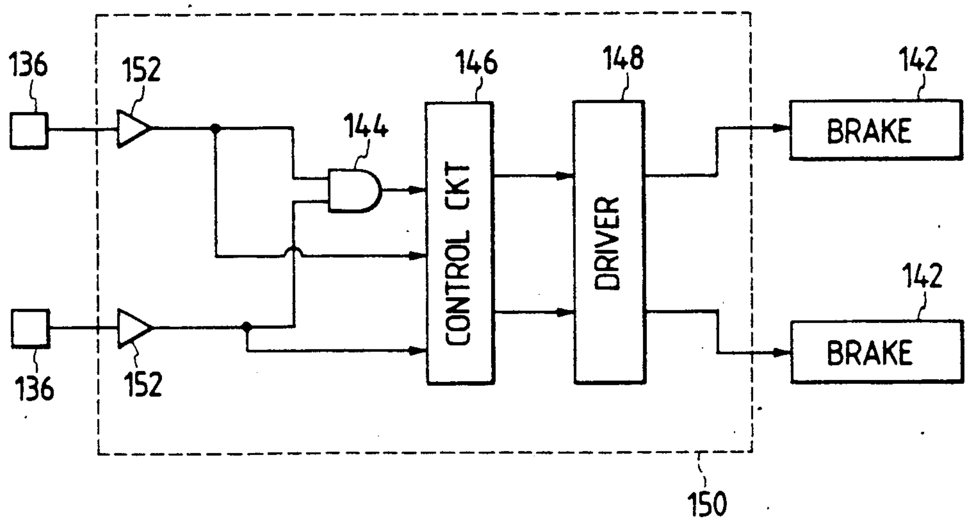
FIG. 10 is a block diagram showing a control device for controlling the heat-sensitive sheet conveying mechanism.

FIG. 10 is a block diagram showing the arrangement of the control device.

In the control device 150, the detection signals of the meandering detecting devices 133 are applied to amplifiers 152 and 152, respectively. The output signals of the amplifiers are applied to an AND circuit 144 and to an identifying circuit 146. The identifying circuit 146 operates to identify the detecting device 136 which has operated. The output signal of the identifying circuit 46 is applied to a drive circuit 148, and the latter 148 controls the motor 142 so that a load is applied to the brake roller 138 located on the side which is opposite to the side where the meandering detecting device 136 operated is located. Thus, upon application of the load to the motor 142, the tension given to the edge portion of the heat-sensitive sheet D is increased, as a result of which the heat-sensitive sheet D is shifted to decrease the tension thus increased; that is, the meandering of the heat-sensitive sheet is corrected.

As was described above, in the recording apparatus of the invention, the angle of inclination of the roller following the slackening of the sheet-shaped material which is caused when it meanders is detected as the angle of rotation (or swing) of the respective arm supporting the roller, and therefore the meandering of the sheet-shaped material can be detected with high accuracy, and in a recording apparatus using a sheet-shaped recording material, its printing operation can be carried out accurately.

Furthermore, according to the invention, the torque of the brake rollers is changed thereby to increase or decrease the tension applied to both edge portions of the recording material, whereby the meandering of the recording material can be corrected, and therefore a printing operation is achieved accurately at all times.

Figure 11:
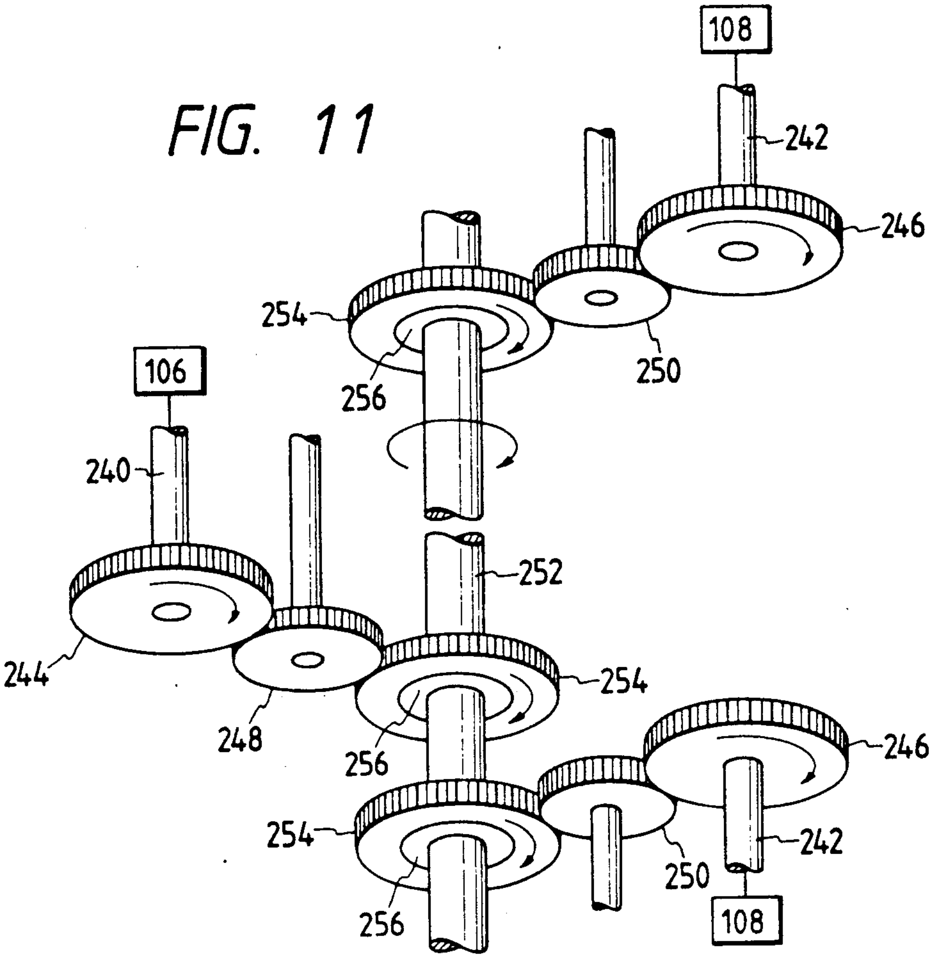
FIG. 11 is a perspective view of a conveying roller drive mechanism in the printing section.

FIG. 11 is a perspective view showing a conveying roller/ drive mechanism in the printing section.

The conveying rollers 106 and 108 (FIG. 2) are fixedly mounted on shafts 240 and 242, respectively, to which driven gears 244 and 246 are fixedly secured, respectively. The driven gears 244 and 246 are engaged with speed change gears 248 and 250, respectively. The gears 248 and 250 are engaged with driven gears 254 fixedly mounted on a shaft 252 which is driven by the electric motor 56. A one-way clutch 256 is mounted on the shaft 252 to turn the latter and accordingly the driven gears 254 clockwise as indicated by the arrows in FIG. 11.

When the heat-sensitive sheet D is automatically fed, the motor 56 rotates the shaft 252 in the direction of the arrow, and the rotation of the shaft 252 is transmitted through the one-way clutch 256, the driven gears 254, the speed change gears 248 and 250 and the driven gears 244 and 246 to the conveying rollers 106 and 108, so that the heat sensitive sheet D is conveyed forwardly.

During printing, the heat-sensitive sheet D is conveyed by the conveying rollers 82 located near the sheet discharging section. In this operation, the motor 56 for rotating the conveying rollers 106 and 108 in the printing section is not operated, and the conveying rollers 106 and 108 are rotated by the heat-sensitive sheet being conveyed. On the other hand, the one-way clutch 256 idles with respect to the shaft 252, because, in transmitting a drive force, a load in the opposite direction is applied the one-way clutch 256.

In the case of using the heat-sensitive sheet Da cut in the form of a piece of paper different from the heat-sensitive sheet D wound in the form of a roll, the shaft 18 is turned reversely by the motor 20 in the accommodating section 10 so that the heat-sensitive sheet D is moved backwardly. In this case, the motor 56 for rotating the rollers 106 and 108 in the forward direction may be rotated reversely in order to offset or cancel the rotational torque transmitted through the one-way clutch 256 from the sheet D. Namely, it would be impossible to completely interrupt the transmission torque simply by using the one-way clutch.

Accordingly, in the printing section, the conveying rollers 106 and 108 rotate following the heat-sensitive sheet D during printing, thus not affecting the conveyance of the heat-sensitive sheet D; that is, the sheet D is positively conveyed.

When the heat-sensitive sheet D is automatically fed or it is moved backwardly, the thermal heads 42 and 44 are moved away from the heat-sensitive sheet D. In this connection, the recording apparatus may be so designed that, when the thermal heads 42 and 44 print the heat-sensitive sensitive sheet D, the conveying rollers 106 and 108 are moved away from the heat-sensitive sheet D. This may be achieved, for instance, by the following method: Eccentric cams abutted against the shafts 240 and 242 of the conveying rollers 106 and 108 are turned. According to the method, the conveying rollers 106 and 108 can be spaced away from the heat-sensitive sheet D when it is printed or moved backwardly.

As was described above, according to the invention a plurality of printing means are arranged in a plurality of lines and the recording material conveying rollers are arranged in alignment with the printing means; that is; the printing means and the conveying rollers are effectively arranged. Furthermore, when the printing section is not in operation, the printing means are moved away from the recording material, as a result of which when no printing operation is carried, the printing means will not obstruct the conveyance of the recording material; that is, the latter can be smoothly conveyed.

In addition, when the printing section is not in operation, the drive force to the conveying rollers is interrupted, and the recording material is conveyed with the additionally provided conveying rollers.

When, after the heat-sensitive sheet D wound in the form of a roll has been printed, the heat-sensitive sheet Da cut in the form of a piece of paper is printed, the heat-sensitive sheet D is retracted behind the conveying rollers 72 positioned close to the sheet inserting opening of the printing section 40. In order to perform a printing operation with the heat-sensitive sheet D again after the heat-sensitive sheet Da, it is necessary to convey the retracted heat-sensitive sheet D to the printing section. If, in this case, the front end portion of the sheet remains curled, then the sheet D is not conveyed correctly in the direction of conveyance, with the result that it is jammed in the sheet conveying path. Therefore, it is preferable that all of the conveying rollers have the following jamming preventing device according to the invention. In the recording apparatus, the jamming preventing device is provided for the conveying rollers 106 and 108 in the printing section.

Figure 12:
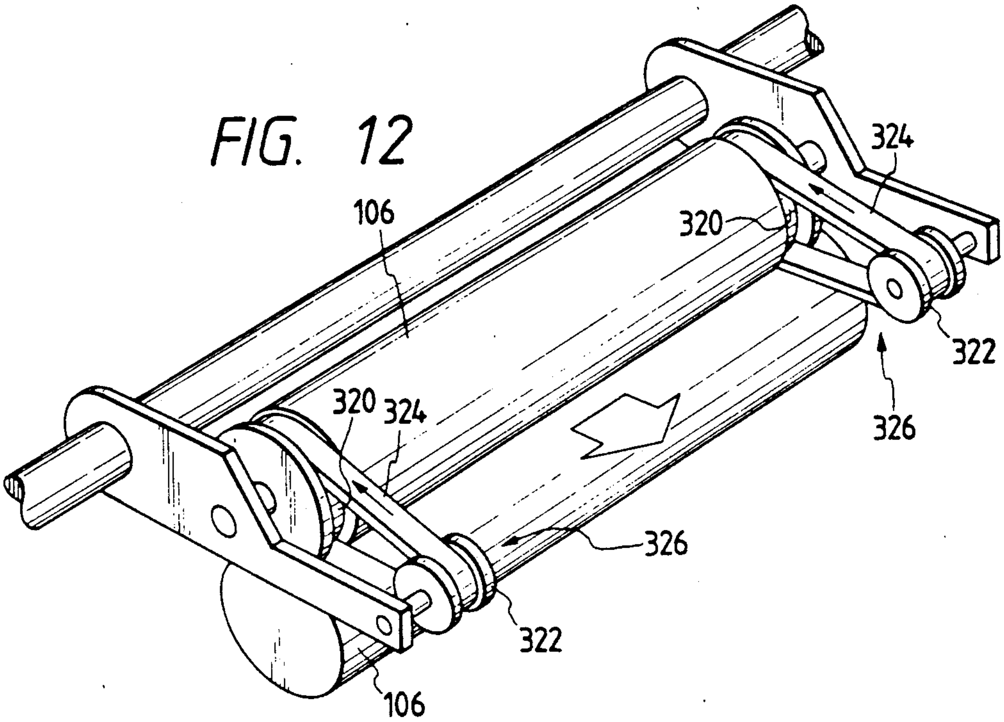
FIG. 12 is a perspective view showing jamming preventing devices provided for conveying rollers 106.

FIG. 12 is a perspective view showing the jamming preventing device provided for the conveying rollers 106.

First pulleys 320 and 320 are formed in both end portions of the upper conveying roller 106, respectively, and second pulleys 322 and 322 are provided in front of belts 324 and 324 are laid over the pairs of first and second pulleys 320 and 322, respectively. The pulleys 320 and 322 and the belts 324 form the jamming preventing device. The first pulleys 320 are integral with the conveying roller 106; however, they may secured to the conveying roller 106 in such a manner as to be coaxial with the latter 106. The lower conveying roller 106 is rotated by the motor 56, so that the heat-sensitive sheet D is conveyed while being held between the two conveying rollers 106. The surface of each belt 324 laid over the respective first pulley 320 is flush with or lower than that of the conveying roller 106, and therefore at the sheet nipping region of the conveying rollers 106 the belt 324 driven is in contact with or not in contact with the heat-sensitive sheet D. The belts 324 are driven to convey the heat-sensitive sheet D forwardly, thus preventing the front end portion of the heat-sensitive sheet D from rising at both ends of the conveying roller 106. In other words, even if the front end portion of the heat-sensitive sheet D remains curled, the belts 324 hold down the rising of the front end portion, as a result of which the sheet D is accurately forwarded in the predetermined direction of conveyance.

In the case where the front end portion of the heat-sensitive sheet D remains curled, the curled front end portion of the heat-sensitive sheet D conveyed by the conveying rollers 106, after passing through the sheet nipping region of the conveying rollers 106, is brought into contact with the belts 324, so that its rising is limited thereby. In this operation, the belts 324 are driven at the same speed as the conveying rollers 106, and therefore the heat-sensitive sheet D is moved together with the belts 324, and accordingly the heat-sensitive sheet D and the belts 34 are not brought into slide contact with each other. Accordingly, no scratches are formed on the recording surface of the heat-sensitive sheet D; that is, the recorded image is not damaged at all.

In the above-described recording apparatus, the front end portion of the heat-sensitive sheet D may be curled upwardly, and therefore the jamming preventing devices are provided above the heat-sensitive sheet D. In the case where the sheet may curl downwardly, the jamming preventing devices are provided below the sheet.

In the case where, as in the above-described recording apparatus, a plurality of conveying rollers are coaxially provided over the width of the heat-sensitive sheet D, it is effective in preventing the jamming of the heat-sensitive sheet to provide the jamming preventing devices at least at the outermost ends of the conveying rollers as was described above. In the case where elongated conveying rollers are provided over the width of the heat-sensitive sheet D, it goes without saying that the jamming preventing devices 326 are provided at both ends of the conveying rollers; and when necessary another jamming preventing device 326 may be added with another pulley formed at the middle of the conveying roller, which will before effective in preventing the jamming of the heat-sensitive sheet D.

In the above-described embodiment, the jamming preventing devices are provided only for the conveying rollers 106 and 108. However, the devices may be provided for all the sheet conveying rollers in the recording apparatus. In this case, the jamming of the heat-sensitive sheet can be prevented in all the sheet conveying path.

A was described above, according to the invention, the belts laid over the first pulleys provided coaxially with the conveying roller and the second pulleys provided in front of the first pulleys are driven in the direction of conveyance of the recording material. Therefore, even if the front end portion of the recording material remains curled, the curled front end portion is moved together with the belts, so that the recording material is correctly conveyed along the predetermined direction of conveyance. Accordingly, the jamming preventing device of the invention will prevent the jamming of the recording material in the recording material conveying path, and allow the positive conveyance of the recording material.

Figure 13:
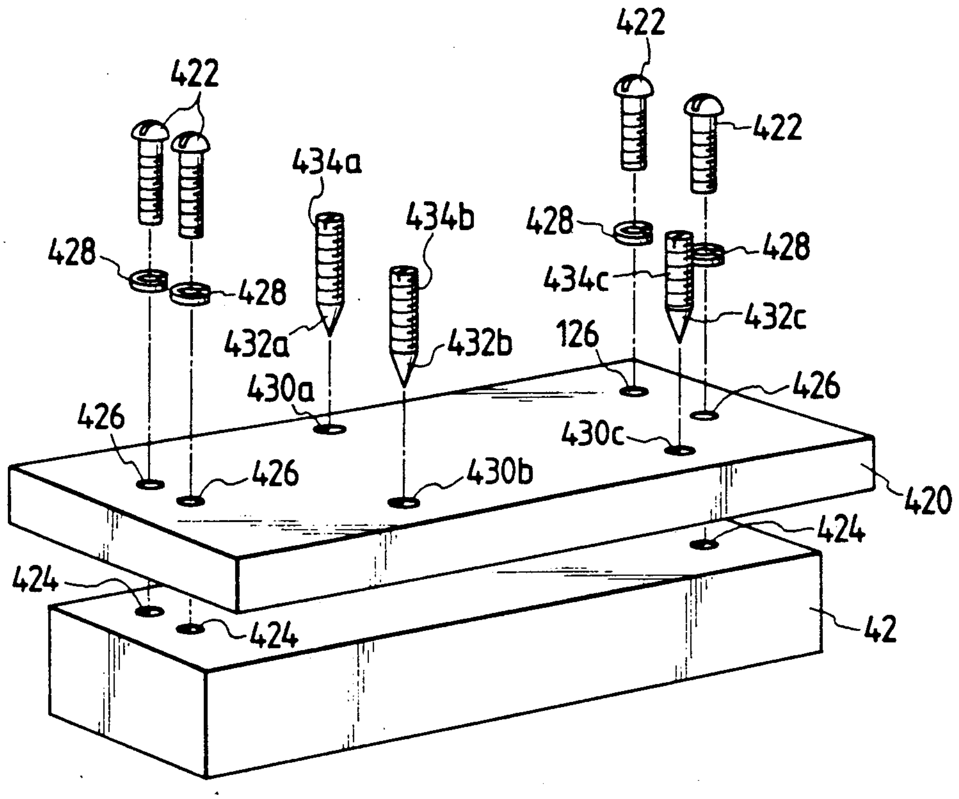
FIG. 13 is a perspective view for a description of a method of assembling a thermal head had a base board.

FIG. 13 is a perspective view showing a method of assembling the thermal head 42 and its base board 420. The other thermal head 44 can be assembled with its base board in the same manner.

The thermal head 42 is elongated and rectangular. Both end portions, in the longitudinal direction, of the thermal head 42 are fixedly secured to the base board 420, which is in the form of a flat plate, with fixing screws 422. Threaded holes 424 engageable with the fixing screws 422 are formed in the two end portions, in the longitudinal direction, of the thermal head 42, and through-holes 426 in which the fixing screws 422 are to be loosely fitted are formed in the base board 420. The fixing screw' 422 are inserted through spring washers 428 into the holes 426 of the base board 420 from above, and then engaged with the threaded holes 424 of the thermal head 42, respectively, so that the latter 42 is fixedly secured to the base board 420.

Figure 14:
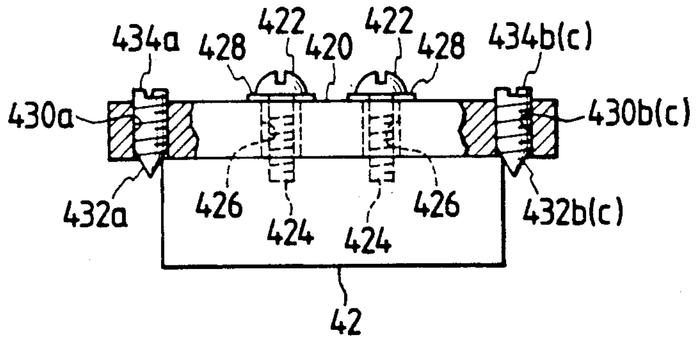
FIG. 14 is a side view, with parts cut away, showing the board to which the thermal head is secured.

Three threaded holes 430*a*, 430*b* and 430*c* are formed in the base board 420 in such a manner that they confront with the upper surface of the thermal head 42 and are arranged at the vertexes of a triangle. FIG. 14 is a side view, with parts cut away, of the base board 420 with the thermal head 42 showing the vicinity of the three threaded holes 430*a* through 430*c*. The threaded hole 430*a* is so positioned that one edge of the thermal head 42 is set across it, whereas the remaining threaded holes 430*b* and 430*c* are so positioned that the opposite edge of the thermal head 42 is set across the threaded holes 430*b* and 430*c*. The sum of the areas of the edge regions of the thermal head which are laid over the threaded holes 430*a* through 430*c* is smaller than a half (½) of the sum of the area of the threaded holes 430*a* through 430*c*. portions 432*a* through 432*c* are engaged with the threaded holes 430*a* and 430*c*, respectively, in such a manner that the conical end portions 432*a* through 432*c* are extended from the lower surface of the base board 420 to touch the edges of the thermal head 42. That is, the three conceal end portions 432*a* through 432*c* are brought into contact with the two edge of the upper surface of the thermal head, so that the latter 42 is limited in horizontal movement.

Figure 15:
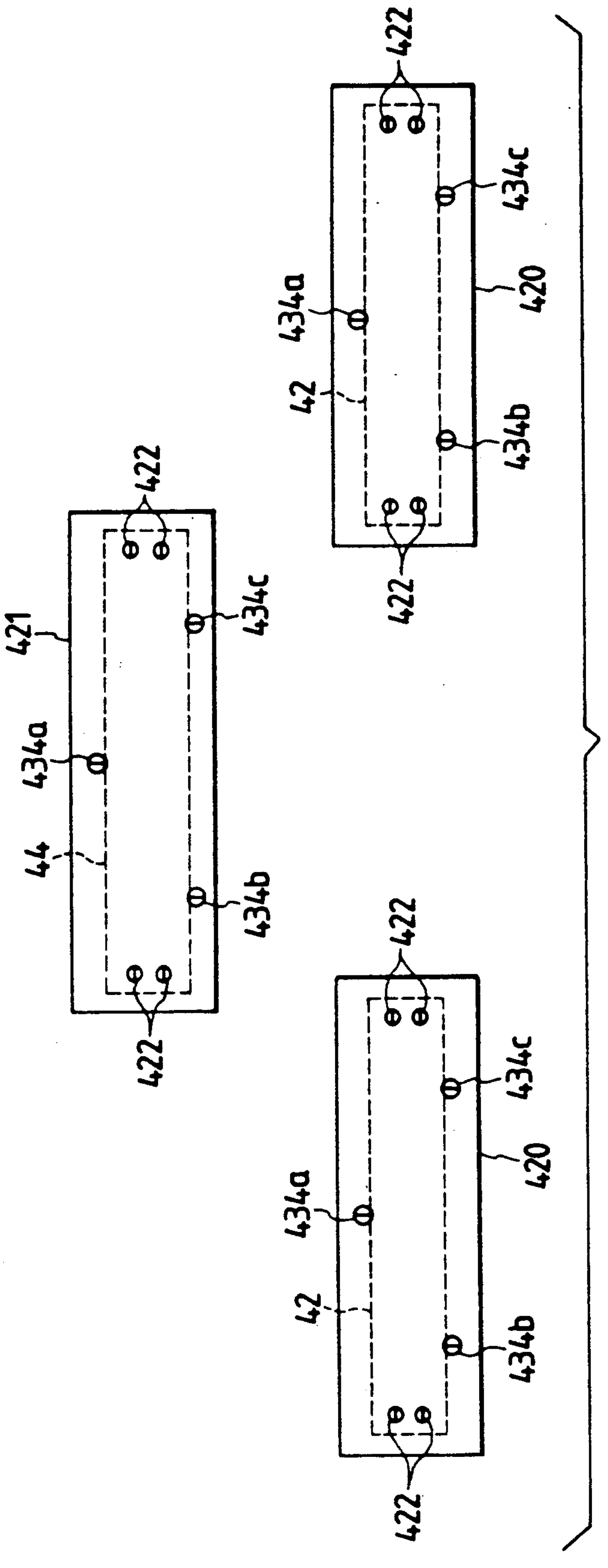
FIG. 15 is a plan view showing the arrangement of three thermal heads.

FIG. 15 is a plan view showing the arrangement of the three thermal heads 42 and 44.

If the three thermal heads 42 and 44 are not in parallel with each other, then the resultant prints are not continuous. Therefore, it is necessary that, before the thermal heads 42 and 44 are fixedly secured to the base boards 420 and 421, the thermal heads 42 and 44 should be positioned accurately in parallel with each other.

Adjustment of the positions of the thermal heads 42 and 44 will be described.

The base boards 420 and 421 are fixedly secured to the support members 60 and 62, and are rotatably supported by the shifts 64 and 66, respectively. That is, the base boards 420 and 421 are mounted substantially accurately. Accordingly, all that is necessary is to finely adjust the positions of the thermal heads so that they are in parallel with each other when they are mounted on the base boards.

First, the end portions of the thermal heads 42 and 44 are temporarily secured to the base boards 420 and 421 with the fixing screws 422. That is, the fixing screws 422 are slightly engaged with the thermal heads 42 and 44 so that the latter may not come off the base boards. Under this condition, the thermal heads 42 and 44 are slightly slidable with respect to the base boards 420 and 421, because the through-holes 426 formed in the base boards 420 and 421 are larger in diameter than the fixing screws 422.

Thereafter, the adjusting screws 434*a* through 434*c* are engaged with the threaded holes 430*a* through 430*c* arranged it the triangle vertexes, respectively, in such a manner that the conical end portions 432*a* through 432*c* are protruded from the lower surfaces of the thermal heads 42 and 44. Then, the conical end portion 432*b* of the adjusting screw 434*b* is brought into contact with the edge of the respective thermal head (42 or 44). Under this condition, the remaining adjusting screws 434*a* and 434*c* are turned; that is, the amounts of protrusion from the lower surface of the respective base board (420 or 421) of the conical end portions 432*a* and 432*c* are changed to bring the latter into contact with the edge of the thermal had. If, in this case, one thermal head 42 is not in parallel with the other 44, then the two adjusting screws 434*a* and 434*c* are turned; that is, the amounts of protrusions of the conical end portions 432*a* and 432*c* are changed so that the thermal head 42 is turned in a plane until the thermal head 42 becomes parallel with the other 44. When the adjusting screws 434*a* through 434*c* are turned, the thermal heads 42 and 44 are considerably slightly moved; that is, the amounts of movement of the thermal heads 42 and 43 are considerably small. Therefore, the positional relationships between the thermal heads 42 and 44 can be finely adjusted by turning at least two of the adjusting screws 434*a* through 434*c*.

In addition, the distance between the thermal heads 42 and 44 arranged in two lines can be adjusted by turning the adjusting screws 434*a* and through 434*c*.

Thus, the adjustment of the positions of the thermal heads 42 and 44 has been accomplished. Under this condition the fixing screws 422 are further tightened so that the thermal heads 42 and 44 are positively secured to the base boards 420 and 421.

As was described above, according to the invention, the positions of the thermal heads can be adjusted little at a time by turning the adjusting screws with their conical end portions in contact with the edges of the thermal heads; that is, the positions of the thermal heads can be finely adjusted with ease. Particularly in a recording apparatus having a plurality of thermal heads, the positions of the thermal heads can be finely adjusted relative so each other accordingly to the invention, and therefore the printing operation can be achieved with the thermal head accurately.

Figure 16:
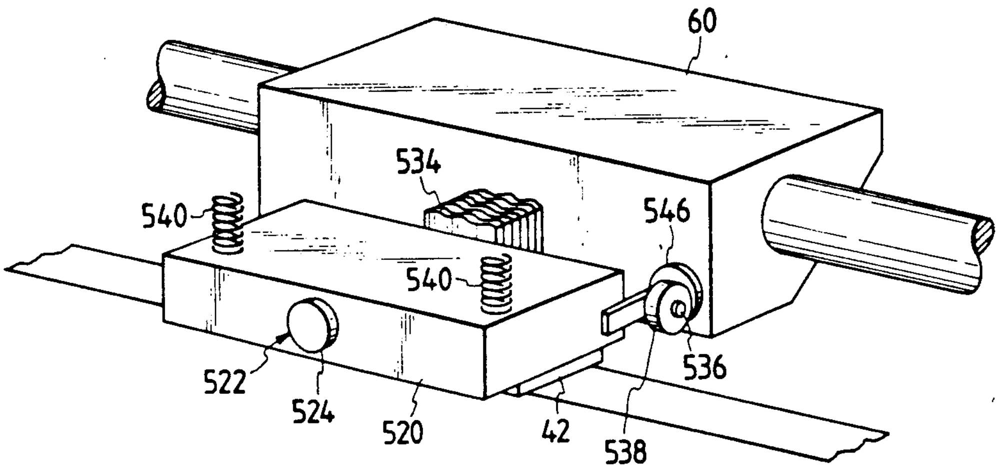
FIG. 16 and 17 are a perspective view and a plan view of a thermal head mounting device according to the invention, respectively.
Figure 17:
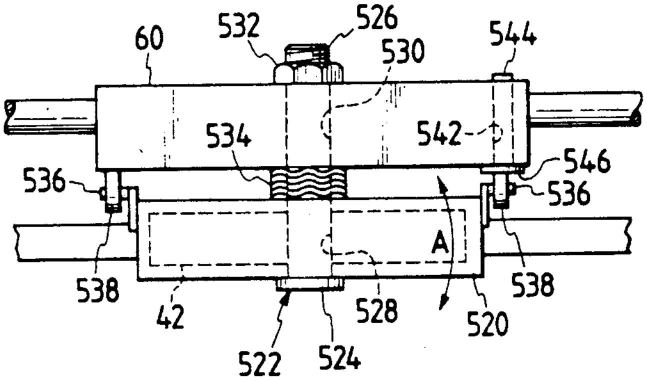

FIGS. 16 and 17 are a perspective view and a plan view showing one example of a thermal head mounting device according to the invention, respectively. The same mounting devices are provided for all the thermal heads 42 and 44. Therefore, only the mounting device for the thermal head 42 will be described.

The thermal head 42 is provided along a rectangular-prism shaped base board 520. The base board 520 has shaft 522 at the middle, which rotatably supports the base board 520. The shaft 522 has a head portion 524 at one end, and a threaded portion 526 at the other end The shaft 522 is inserted into a hole 528 formed in the base board 520 and into a hole 530 formed in the support member 60 and engaged with a nut 532. The base board 520 is fixedly tightened against the support member 60 with wave washers 534 mounted on the shaft 522 between the base board 520 and the support member 60.

The base board 520 has shafts 536 at both ends, on which ball bearings 538 rotatably mounted in such a manner that the bill bearings roll on the support member 60. The ball bearings 538 maintain the distance between the base board 520 and the support member 60, and prevents the base board 520 from turning as indicated by the arrow A in FIG. 17. When the base board 520 turns about the shaft 522, the ball bearings roll to allow the base board to turn smoothly. Spring members 540 are abutted against the base board 520 to urge the later 520 downwardly, so that the thermal held 42 can be brought into close contact with the heat-sensitive sheet D on the platen roller 46.

One of the ball bearings 538 is in contact with the head 546 of a support screw 544 which is engaged with a threaded hole 542 formed in the support member 60. The head 546 of the support screw 544 is large enough to provide a rolling area for the ball bearing 538. The amount of protrusion of the head 546 from the support member 60 can be adjusted by turning the support screw 544 from behind the support member 60. For instance in the case where the thermal head has been positioned slightly deflected from the correction direction, the support screw 544 may be turned to slightly change the distance between one end of the thermal head and the base board from that between the other end of the thermal head and the base board, thereby to finely adjust the direction of the thermal held.

In the recording apparatus with the above-described thermal position adjusting device, when the thermal head 42 was in close contact with the heat-sensitive sheet D, the vertical deflection of the base board was 0.01 mm to 0.03 mm at the end. On the other arranged it the triangle vertexes, respectively, in such a hand, when the ball bearings 538 were removed from the thermal head mounting device, the vertical deflection of the base board was 0.05 mm to 0.1 mm. This means that the provision of the above-described thermal head mounting device can minimize the adverse effect on the printing operation which may be caused by the error in installation of the thermal head.

Use of rollers instead of the ball bearings 538 can maintain the distance between the base board 520 and the support member 60 constant, and to suppress the vertical reflection of the base board at the ends.

With the thermal head mounting device according to the invention, the rolling elements provided at the ends of the base board are in contact with the support member, so that the distance between the base board and the support member is kept unchanged. Therefore, even if the thermal head is mounted on the rotary shaft with play, the main scanning direction of the thermal head is maintained correctly. In addition, in the thermal head mounting device of the invention, the guide member adapted to guide the rolling element is adjustable in the amount of protrusion from the support member. Therefore, during assembling the thermal head can be positioned in the correct direction, which promises an accurate printing operation.

FIGS. 18 and 19 show a pinch roller device in a recording apparatus according to the invention. More specifically, the part (a) of FIG. 18 is a side vide showing rollers abutted against each other, and the part (b) is a side view showing the rollers set away from each other and the part (a) of FIG. 19 is a plan view showing the rollers abutted against each other, and the part (b) of FIG. 19 is also a plan view showing the rollers spaced away from each other. The device corresponds to the conveying rollers 24 and 26 in the accommodating section 10.

The upper ones of the two pairs of conveying rollers 24 and 26 are rotatably supported, at the ends, by support arms 630, which are rotatably mounted on a common shaft 632. Springs 634 are interposed between the upper frame of the accommodating section 10 and the support arms 630 so that the upper rollers 24 and 26 are elastically pushed against the lower rollers 24 and 26.

FIG. 20 is an exploded view showing the vicinity of the swingably supported end portions 636 of one of the pairs of support arms 30.

Each of the swingably supported end portions 636 of the support arms 630 is formed by cutting the latter in its widthwise direction thus having a step 638. The end portions 636 are laid one on another and swingably supported; that is, the end portions 636, and accordingly the supports arms 630 are articulated. However, it should be noted that the range of swing is limited by the ends of the steps 638. More specifically, each step 638 is so formed that its distance from the shaft 632 is larger than its distance from the relatively thin swingably supported end portion 636. The steps 638 lock the swingably supported and portions 636 in such a manner that, when the upper rollers 24 and 26 are disengaged from the lower ones 24 and 26, the pair of arms 630 form a predetermined angle.

When the upper housing of the accommodating section 10 is opened, the upper rollers 24 and 26 are moved together with the upper housing, so that they are disengaged from the lower ones 24 and 26. In this operation, the upper rollers 24 and 26, being held urged by the springs in the direction of the arrows A, are swung about the shaft 632. When the support arms 630 turn through a predetermined angle, the swingably supported end portions 636 of the support arms are locked by the mating steps 638; that is, the swing of the support arms 630 is stopped, so that the support arms 630 form the predetermined angle. The angle formed between the support arms 630 is so determined that the upper rollers 24 and 26 are positioned in place when abutted against the lower rollers 24 and 26 again.

In the above-described recording apparatus, with the upper housing of the accommodating section 10 opened, the heat sensitive sheet D is laid over the lower conveying rollers 24 and 26, and then the upper housing is closed so that the sheet D is held between the upper and lower conveying rollers 24 and 26. Since the upper conveying rollers 24 and 26 are urged towards the lower conveying rollers 24 and 26 by means of the springs 634, the heat-sensitive sheet D is conveyed while being positively held between the upper and lower rollers 24 and 26.

In the above-described embodiment, the range of swing of the support arms 630 is limited by the engagement of the swingably supported end portions 636 and the steps 638; however, the invention is not limited thereto or thereby. For instance, as shown in FIG. 21, the upper wall of a cut 638 formed in one of the swingably supported end portions is engaged with the protrusion formed by cutting the other swingably supported end portion. Alternatively, as shown in FIG. 22, locking members 640 are provided on the swingably supported end portions 636 of the support arms in such a manner that they lock the mating swingably supported end portions 636 thereby to limit the range of swing of the support arms.

As was described above, the pinch rollers on the movable side are supported by the support arms, respectively, and the support arms are supported by one shaft, so that two pairs of pinch rollers are movably supported. The support arms lock each other against the elastic forces of the spring means, so that the pinch rollers are held engaged in place. Therefore, the pinch rollers are positioned in place when disengaged, and they can be positively engaged again with ease. Thus, the recording material can be positively conveyed while being held between the rollers.

FIG. 23 is perspective view showing heat-sensitive sheet supporting device in the recording apparatus according to the invention.

A heat-sensitive sheet D is wound, for instance, on a bobbin of paper, when stored. In loading it in the recording apparatus, a shaft 742 is inserted into the bobbin 740, and is retained by flanges 744 and 746 at both ends. Ball bearings 748 are mounted on both end portions of the shift 742. Handles 750 are provided integral with the ball bearing 748. The ball bearings 748 and the handles 740 are secured to the shaft 741. The flange 744 is fixedly secured to the shaft 742, and the flange 746 is detachably mounted on the shaft 742. In mounting the heat-sensitive sheet D thus wound on the bobbin on the shaft 742, first the shaft 742 is inserted into the bobbin 740 on which the heat-sensitive sheet D has been wound, and then one end portion of the bobbin 740 is secured to the flange 744. Under this condition, the flange 746 is mounted of the shaft 742 and is secured to the other end of the bobbin 740 and the shaft 742. In order that the handle 750 may not obstruct the mounting of the flange 746 on the shift 742, the removable flange 746 has a through-hole 752 which the handle 750 passes through.

The heat-sensitive sheet D is loaded in the accommodating section of the recording apparatus with the handles 750 held with the hands.

FIG. 24 is a side view, with parts cut away, showing the heat-sensitive sheet D loaded in the accommodating section 10.

That is, the heat-sensitive sheet D is loaded with the handles 750 placed on supports 754 provided in the accommodating section 10.

the accommodating section 10, one end portion of the shift 742 is in alignment with the drive shaft 758 of a drive unit 756, and the other end portion of the shaft 742 is in alignment with a toggle clamp 760. With the handle 750 set on the supports 756, the lever 762 of the toggle clamp 750 is turned in the direction of the arrow F. As a result, the pushing part 764 of the toggle clamp 760 is moved in the direction of the arrow G to engage with the shaft 742 on which the heat-sensitive sheet D in the form of a roll is mounted, or with the handle 750 under pressure, and the shaft 742 is engaged with the drive shaft 758. Now, the torque of the drive unit 756 can be transmitted to the shaft 742.

As was described above, the heat-sensitive sheet D can be loaded in the accommodating section 10 by holding the handles 750 mounted on both end portions of the shaft 742. Therefore, even a roll of heat-sensitive sheet relatively heavy can be readily loaded in the accommodating section.

The suitable position for loading the heat-sensitive sheet D mounted on the shaft is limited by the drive shaft 758 of the drive unit 756 and the toggle clamp 760, and therefore the shaft 742, on which the heat-sensitive sheet D has been wound, can be readily set on the supports 754; that is, the heat-sensitive sheet D can be considerably readily loaded in the accommodating section 1. Furthermore, the ball bearings 748 are provided inside the handles in such a manner the former are integral with the latter. Accordingly, no matter how the handles 750 are placed on the supports 754, the shaft 742 will rotate satisfactorily.

In order to maintain the shaft 742 on which the heat-sensitive sheet D is wound, the drive shaft 758, and the pushing part 764 of the toggle clamp 760 coaxial, springs 766 are proved on the upper housing of the accommodating section 10 to depress the handles 750, respectively to prevent the vertical vibration of the shaft 742.

As was described above, the recording material in the form of a roll can be loaded in the recording apparatus by holding the handles provided at both ends of the shaft that is, it can be readily loaded in the recording apparatus. Furthermore, since the handles are that the ball bearings, even if the positioning of the roll-shaped recording material is not so high in precision when the handles are supported, the recording material can be positively and smoothly rotated; that is, it can be pulled out with high reliability.

While there has been described in connection with the preferred embodiments of the invention it will be obvious to those skilled in the art that various changes and modifications may be made therein without departing from the invention, and it is aimed, therefore, to cover in the appended claims all such changes and modifications as fall within the true spirit and scope of the invention.

I claim:

1. A recording apparatus comprising:

(a) an accommodation section for storage of recording material;

(b) a plurality of line type printing units which are arranged in a staggered manner with respect to a transverse direction relative to a delivery direction of said recording material, each of said plurality of line type printing units having a predetermined main scanning lenght;

(c) first delivery means arranged in line with said plurality of printing units for delivering said recording material;

(d) second delivery means arranged out of line with said plurality of printing units for delivering said recording material;

(e) switching means for detecting a transmitted drive force and for switching said drive force from said first delivery means to said recording material;

(f) separating means for separating said printing units away from said recording material; and (g) a discharging section for discharging said recording material to the outside;

wherein in printing, said switching means causes said first delivery means to be substantially disabled to transmit the drive force from said first delivery means to said recording material; and wherein in non-printing, said separating means causes said printing units to be separated away from said recording material to thereby prevent any contact between said printing units and the printing material.

2. The recording apparatus according to claim 1, wherein said accommodation section includes a shaft for supporting said recording material in roll.

3. The recording appaıatus according to claim 1, further comprising an insertion inlet for feeding a web-shaped recording material.

4. The recording apparatus according to claim 1, wherein said accommodation section includes an upper housing on which a web-shaped recording material is laid and a drive section for rotating a rolled recording material.

5. The recording apparatus according to claim 1, wherein said second delivery means includes a pair of long rollers each comprising short rollers.

6. The recording apparatus according to claims 1, further comprising fixing means for fixing a leading end of said recording material in the vicinity of said discharging section.

7. The recording apparatus according to claim 1, further comprising a printing housing in which said printing units are encased, a recording section body, and locking means for guiding and retaining said printing housing and said recording section body in alignment with each other.

8. The recording apparatus according to claim 1, further comprising meandering detecting means for detecting any meandering motion of said recording material.

9. The recording apparatus according to claim 1, further comprising jamming preventing means for preventing said recording material from being jammed in a delivery path.

10. The recording apparatus according to claim 1, wherein said printing units include thermal heads.

11. The recording apparatus according to claim 10, further comprising adjusting means for adjusting positions of said thermal heads.

12. The recording apparatus according to claim 10, further comprising mounting means for mounting said thermal heads in place.

13. The recording apparatus according to claim 2, further comprising two pairs of rollers disposed close to said supporting shaft of said recording material in a roll, two rollers of said pair of rollers being retained in a predetermined relation.

14. The recording apparatus according to claim 1, wherein a width of said recording material exceeds 900 mm.

15. The recording apparatus according to claim 1, wherein said discharging section includes a discharging stand for holding the discharged recording material.

16. The recording apparatus according to claim 15, wherein an optically fixing means is disposed above said discharging stand.

17. The recording apparatus according to claim 2, wherein handles integrated with bearings are provided at opposite ends of said supporting shaft for supporting said rolled recording material.

18. The recording apparatus according to claim 8, wherein said meandering detecting means comprises:

at least one roller which is supported by a pair of rotatable arms and placed on the upper surface of said recording material;

angle detectors coupled to the rotary shafts of said arms, respectively; and drive means for turning said arms simultaneously to allow said roller to abut against said sheet-shaped material under a predetermined pressure.

19. The recording apparatus according to claim 18, wherein said jamming preventing means comprising:

a first pulley provided coaxial with a conveying roller for conveying a recording material, said first pulley being rotated together with said conveying roller;

a second pulley provided in front of said first pulley in the direction of conveyance of said recording material; and an endless belt laid over said first and second pulleys under tension, the turning radius of said belt over said first pulley being equal to or less than the radius of said conveying roller.

20. The recording apparatus according to claim 1, further comprising pinch rollers which are engageable supported; in which a pair of support arms which rotatably support said pinch rollers on one side have end portions which are switchably supported by one shaft;

elastic means are provided on said support arm, to urge said pinch rollers on one side towards said pinch rollers on the other side; and said end portions of said support arms have locking means for locking said end portions confronted therewith against the forces of said elastic means.

21. The recording apparatus according to claim 1, further comprising a device for supporting a recording material wound in the form of a roller on a bobbin, which comprises:

a shaft which is inserted into said bobbin;

ball bearings and handles integral with said ball bearings, said ball bearings and handles being mounted on both end portions of said shaft;

flanges disposed between said handles, for retaining said recording material at both ends, said flanges coupled through said bobbin.

* * * * *